April 24, 1928.

H. M. WILLIAMSON 1,667,021

TRANSLATOR OF ELECTRICAL ENERGY

Filed Dec. 8, 1923

INVENTOR.
Henry M. Williamson

BY Thomas G. Steward

ATTORNEY.

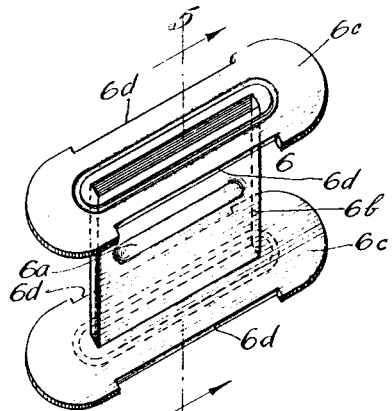
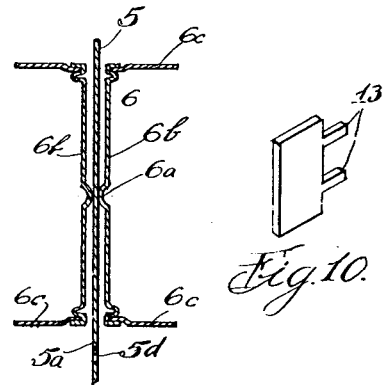
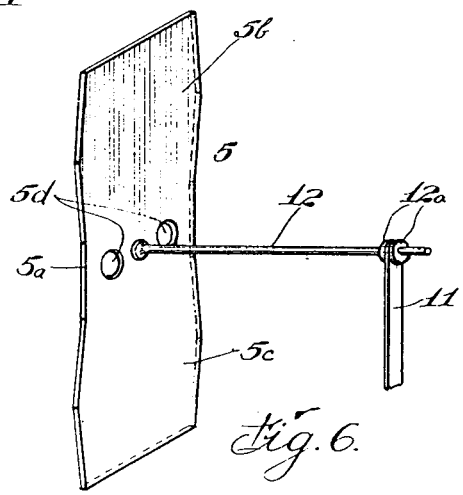
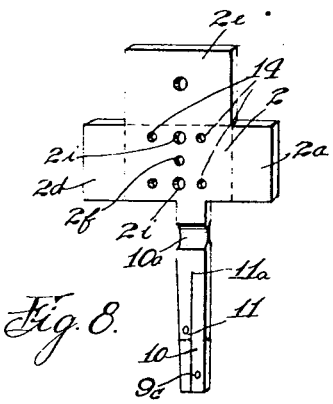
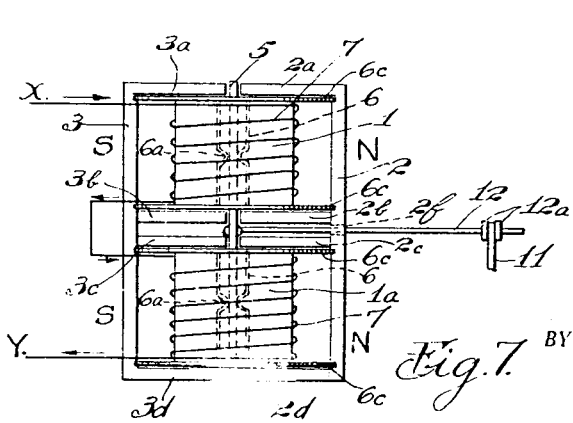

April 24, 1928. 1,667,021
H. M. WILLIAMSON
TRANSLATOR OF ELECTRICAL ENERGY
Filed Dec. 8, 1923    3 Sheets-Sheet 3

INVENTOR.
Henry M. Williamson
BY
Thomas G. Steward
ATTORNEY.

Patented Apr. 24, 1928.

1,667,021

UNITED STATES PATENT OFFICE.

HENRY M. WILLIAMSON, OF CHICAGO, ILLINOIS, ASSIGNOR TO JOHNSON-WILLIAMSON LABORATORIES, INCORPORATED, OF CHICAGO, ILLINOIS.

TRANSLATOR OF ELECTRICAL ENERGY.

Application filed December 8, 1923. Serial No. 679,426.

The invention relates to instruments of the type wherein electrical impulses are translated into audible sound waves or into physical vibrations of material elements which are capable of responding to the frequencies of such impulses, objects of said invention being to intensify and clarify the translations, to avoid elimination of characteristic features of the electrical impulses in the translating instrument, whereby the translations will substantially correspond with said impulses, and to produce a translating instrument which is simple and inexpensive.

The invention will be understood if reference is made to the following description and the accompanying drawings, in which—

Figure 4 is a perspective view showing a bobbin constituting a part of one of the electro-magnets;

Figure 5 is a sectional view, taken on the line 5—5 of Figure 4;

Figure 6 is a perspective view of the armature and its transmitting stylus;

Figure 7 is a view in elevation showing the pole pieces, the bobbins and the windings of the electro-magnets;

Figure 8 shows a blank for one of the two pole pieces;

Figure 9 shows a blank for the other pole piece, and

Figure 10 shows one of the inner terminals with which the pole pieces are provided.

Figure 1:
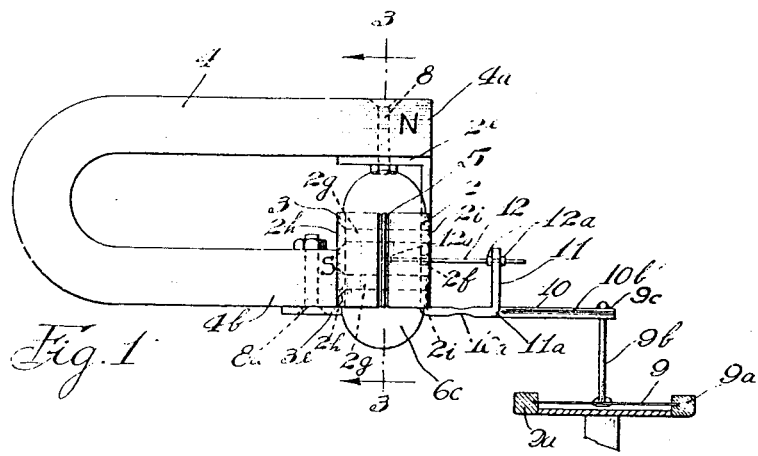
Figure 1 is a plan view of a device embodying the invention.

The device in which the invention is embodied comprises a plurality of electro-magnets 1 and $1^a$, pole pieces 2 and 3, a permanent magnet 4, and an armature 5.

Each of the electro-magnets, 1, $1^a$, includes a hollow bobbin 6, and a winding 7. The mechanical constructions of these electro-magnets may be identical, although the windings are so connected as to produce different magnetic fields.

The pole piece 2 has, preferably, four terminals $2^a$ and $2^b$, and $2^c$ and $2^d$, between which the electro-magnets 1 and $1^a$ are, respectively, disposed. The other pole piece 3 is provided with similar terminals $3^a$ and $3^b$, and $3^c$ and $3^d$, between which the electro-magnets, 1 and $1^a$, are also, respectively, disposed.

The permanent magnet 4 is, preferably, of U form, and has a long leg $4^a$ and a short leg $4^b$, the long leg being secured to an extension $2^e$ of the pole piece 2, while the short leg $4^b$ is secured to an extension $3^e$ of the pole piece 3, bolts 8 and $8^a$ being, respectively, employed as the securing means.

The armature 5 consists of a strip of soft iron extending through the hollow bobbins 6, and laterally sustained in each bobbin between fulcra $6^a$, preferably disposed about midway the length of each bobbin and formed by displaced portions of the walls $6^b$. This armature should be sufficiently thin at its middle portion $5^a$ to afford the required degree of resiliency, regardless of the thickness of other parts thereof, whereby it is, in effect, divided into two parts, $5^b$ and $5^c$, each of which fulcrums at $6^a$ and is responsive to variations in the lines of force developed adjacent thereto by currents flowing through the windings of the proximate electro-magnet. The resiliency may be varied by providing the armature with holes $5^d$ which reduce the sectional area of its middle portion, and said armature should be reduced in width at all parts thereof which are out of line with the fulcra $6^a$, the object being to avoid contact with the sides of the bobbin and prevent chattering.

The bobbins are each composed of some non-magnetic material, such as brass or aluminum, and the body of each is a flattened tube which substantially conforms to the shape of the armature which extends through both bobbins. The ends of the bobbins are provided with flanges $6^c$ between which the windings 7 are laid, and these flanges have wide recesses $6^d$ in which the pole pieces 2 and 3 are seated, the width of the flanges $6^e$ being such as to space the pole pieces and their several terminals sufficiently to permit free vibrations of the ends and two intermediate parts of the armature and establish pre-determined air gaps between the armature and the pole pieces. The pole pieces are held in position by screws $2^g$, extending through holes $5^d$ in the armature and holes $2^h$ in the pole piece 3 and threaded into holes $2^i$ in the pole piece 2.

Vibrations of the armature are transmitted to some extraneous object, such as a diaphragm 9 mounted in a ring $9^a$, through a lever 10 of the third class, flexibly mounted at $10^a$ and actuated by an arm 11 fixed to said lever at $11^a$, said arm being rigidly connected at $11^b$ with a transmitting stylus 12 which extends through a hole $2^f$ in the pole piece 2 and is suitably attached to said armature. A small rod $9^b$ connects the lever 10 with the diaphragm 9 at $9^c$, and the stylus 12 which extends through the arm 11, has shoulders $12^a$ upset against opposite sides of said arm. The lever 10 and the arm 11 are, preferably, integrant extensions of the pole piece 2 which is the blank shown in Figure 8, appropriately bent as indicated by dotted lines.

The pole pieces 2 and 3, and their respective terminals $2^a$ and $3^a$, and $2^d$ and $3^d$, are formed from the blanks shown in Figures 8 and 9, these integrant products being easily and cheaply made in a punch press. The terminals $2^b$, $3^b$, $2^c$ and $3^c$, are of the form shown in Figure 10 and are provided with lugs 13 which extend through holes 14 in the respective pole pieces 2 and 3 and are upset at their ends.

Figure 2:
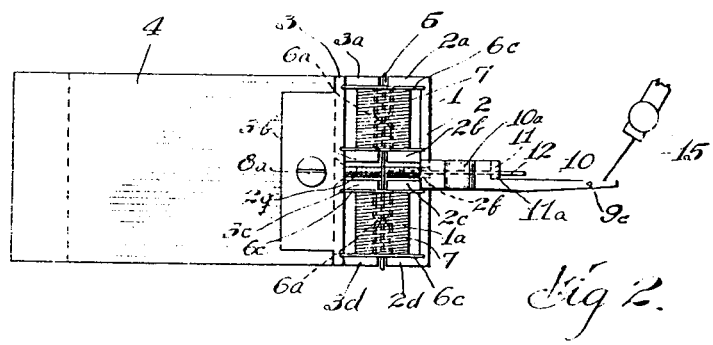
Figure 2 is a view in elevation showing a side of the device.
Figure 3:
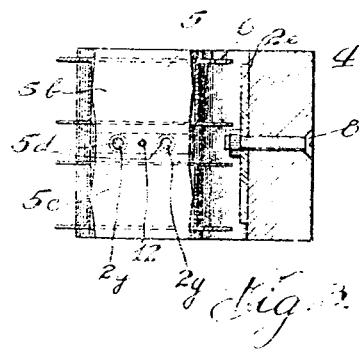
Figure 3 is a sectional view, taken on the line 3—3 of Figure 1, the windings of the electro-magnets being omitted.

The lever 10 may be provided with a groove or depression $10^b$ for reception of the stylus 15 of a phonograph, as shown in Figure 2.

In operating the device, an alternating current is permitted to enter at X, the output being at Y, Figure 7. The current flows through the winding of the electro-magnet 1 from which it passes to and through the reverse windings of the electro-magnet $1^a$, whereby, in obedience to a known physical law, the resulting fields of magnetic force set up in the armature what are termed "consequent poles," these poles being disposed at the center of said armature. That is, if the poles at the extremities of the armature are north poles, there will be two contiguous south poles at the center of the armature. Should the current be reversed, the positions of the poles will be altered, the north poles being then disposed contiguously at the center of the armature, while the south poles assume the positions previously occupied by the north poles.

The leg $4^a$ of the permanent magnet 4 is a north pole, while the leg $4^b$ is a south pole, and, consequently, the associated pole pieces 2 and 3 and their respective four terminals, have like polarities. When, therefore, reversals of polarities in the four parts of the armature occur, the adjacent terminals of the pole pieces will each operate to alternately attract and repel those four parts, thereby vibrating the armature. Thus, if the extremities of the armature should be north poles, and the intermediate parts which are disposed betwen the fulcra $6^a$ should be south poles, at any given instant, the extremities of the armature will be attracted by the pole pieces $3^a$ and $3^d$, and repulsed by the pole pieces $2^a$ and $2^d$. At the same time, the intermediate south poles of the armature will be attracted by the intermediate pole pieces $2^b$ and $2^c$, and repulsed by the intermediate pole pieces $3^b$ and $3^c$, so that the armature as a whole will be distorted, the part between the fulcra $6^a$ being flexed in the direction of the pole pieces $2^b$ and $2^c$, and the extremities being flexed in the direction of the pole pieces $3^a$ and $3^d$. The results attending reversals of polarities in the armature are similar, although the flexing of the armature is in the opposite direction. The bending of the armature is minute, although when viewed in relation to the vibrations of sound-producing diaphragms, it is of considerable magnitude and sufficiently ample to produce sound waves of much intensity. It is, of course, well within the elastic limits of the substance of which the armature is composed, so that there is always a tendency to assume the normal median position.

Vibrations of the armature are transmitted through the attached stylus 12, the arm 11, the lever 10 and the stylus $9^b$, to the diaphragm 9, Figure 1, or from the lever 10 to the needle 15 of a phonograph, Figure 2, whereby sound of the required volume is produced. The flexible mounting of the lever 10 at $10^a$, not only enables said lever to vibrate laterally, but tends to hold the armature in normal position. Said mounting, as shown, is produced by reducing the thickness of the lever 10, thereby forming a hinge of resilient character which is capable of sustaining the load imposed by a phonograph needle and its associated elements.

The initial acoustical element of the device is the armature which is normally under tension produced by the attraction of the eight permanently magnetized pole pieces, the utility of this initial tension being avoidance of the work which otherwise would have to be imposed upon the current in overcoming moments of molecular inertia throughout the entire armature, whereby said armature is enabled to translate even the feeblest electrical impulses or variations into mechanical vibrations, and suppression of the higher audible frequency waves is avoided. The attainment of these desirable results renders the sound waves originating at the diaphragm of the instrument both powerful and clear, and ensures their true phase relation to the electrical impulses in the windings of the instrument.

The magnet 4, as stated, has a north pole $4^a$ and a south pole $4^b$, and the respective pole-pieces are of corresponding polarities. Consequently, the armature 5, which is made of soft iron and initially possesses no magnetism, would be equally attracted by the adjacent north and south pole-pieces, provided it were possible to mount it in a median position between said pole-pieces and to provide pole-pieces of equal potencies. Since, however, such a fine adjustment is not attainable, the magnetic pull of one pole will be greater than that of another pole, and also the flow of magnetic flux through the armature will be such that the polarities of its parts which are nearer the pole or poles on one side thereof, will be different from the polarities of the parts which are further from said pole or poles. Under these conditions, the armature will be molecularly tensioned, so that, as stated, it will ever be ready to respond to the successive impulses of the electro-magnet.

The conservation of electrical energy which results from the molecular tension in all parts of the armature, and from the use of a multi-pole armature of reversible character associated with means for utilizing both alternations of an alternating current, admits of the employment of a multiplying lever, such as 10, for amplifying the vibrations of a sound-producing diaphragm and increasing the intensity of the sound waves.

As already stated, the armature is initially held under tension by the attraction of the permanently magnetized pole pieces between which it is disposed. When, therefore, a current flows through the windings of the electro-magnets and magnetizes the armature, thereby establishing consequent poles therein, said armature which was theretofore substantially balanced between the pole pieces, is instantly biased by the attraction of the contiguous unlike poles and by the repulsion of the contiguous like poles, the abnormal molecular stresses being maintained until the electrical impulse ceases. A reverse alternation or impulse operates in the same manner, although biasing of the armature takes place in the opposite direction. The armature is, therefore, a sensitive mechanical element which faithfully responds to variations in current energy, and operates to translate electrical impulses into mechanical vibrations without substantial loss of energy.

Utilization of a plurality of pole pieces, and of an armature which is capable of having a plurality of induced poles, eventuates in a maximum distortion of the armature, the strength of the magnetic flux being proportional to the exposed areas of the poles. The armature of my device, having a polar exposure at four points on each side thereof, is under the influence of forces which, in the aggregate, are eight times as strong as a force produced in an instrument having only a single pole constituting one point of exposure.

The invention is especially useful in the art of radio transmission wherein it is essential that feeble electrical waves reaching a receiving station shall be faithfully translated into intensive and undistorted sound waves.

Although the device is especially adapted for the translation of alternating currents, it may be used with some advantages if supplied with a pulsating or an interrupted current.

Figure 11:
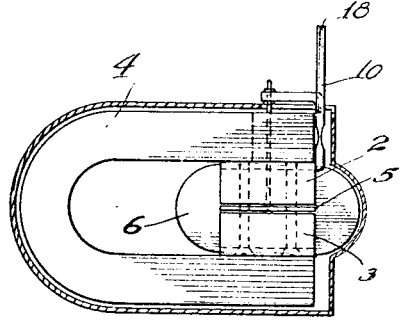
Figures 11 and 12 are, respectively, a plan and an elevation of a modification with the casing in section.
Figure 12:
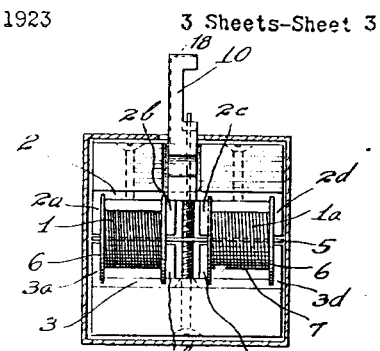
Figure 13:
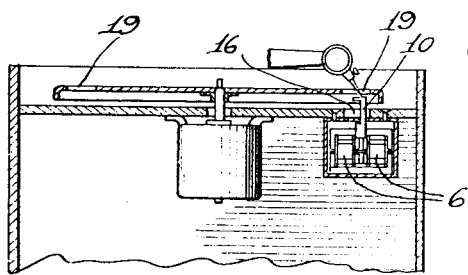
Figures 13 and 14 show a phonograph with my device attached thereto.
Figure 14:
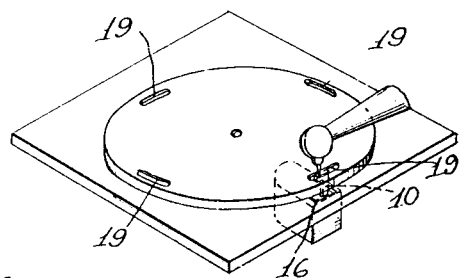

The device shown in Figures 11 and 12 is generally the same as that which has been described, although the permanent magnet has legs of the same length and the pole pieces, the electro-magnets and the armature bear a different angular relation to the permanent magnet, whereby the lever 10 will extend upward through an opening 16 in the floor of a phonograph casing, as shown in Figures 13 and 14, when the device is attached to the under side of said floor, this disposition of the parts admitting of the ready application of the stylus or needle 15 to the groove 18 of the lever when it is transferred from the record of the phonograph with its associated sound box and tone arm.

The blanks from which the pole pieces of the modified device are made are, as respects the integrant parts, different from those shown in Figures 8 and 10, the portions $2^e$ and $3^e$ being omitted and the extensions 10 and 11 being altered, as shown.

The table of the phonograph, Figures 13 and 14, may have several marginal openings 19 through which the needle 15 may be passed downward to engage the groove 18. This arrangement admits of the placing of the device within the limits of the table and economizes space.

Figure 15:
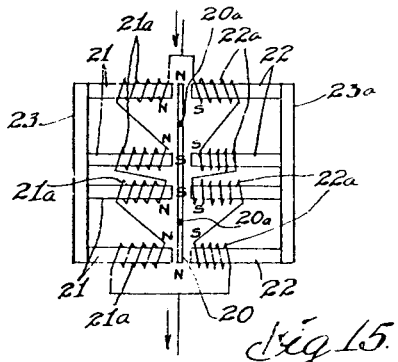
Figure 15 shows a further modification of the invention.

The device represented in Figure 15 involves the same general principle as the devices hereinbefore described, although the specific embodiment is dissimilar. The armature 20, fulcrumed at the points $20^a$, is the element which is permanently magnetized, and the pole pieces 21, 22, are the elements which constitute cores for the reversed windings $21^a$, $22^a$.

The armature may have north poles at its extremities and intermediate south poles, and, if said poles are thus disposed, the windings should be such as to, respectively, produce north and south poles at those ends of the pole pieces 21 and 22 which adjoin the armature. If the polarities of the armature should be the reverse of this, the windings of the device would have to be reversed unless the direction of the current were changed.

Inasmuch, as the attractions and repulsions are the same as those which take place in the use of the device first herein described, it is unnecessary to repeat the description appertaining thereto.

The polarities indicated in Figure 15, are such as prevail at a given instant only, the polarities being reversed when the direction of the current is changed, as it would be if, for instance, an alternating current were flowing through the windings. However, regardless of the direction of the current, certain of the poles which attract will co-operate with certain other poles which repel, thus bringing into action forces which combine and cause a strong vibratory action of the armature and whatever acoustical or other device may be connected therewith.

The pole pieces are, respectively, supported by pieces 23, 23ᵃ of non-magnetic material, such as brass, and are thus magnetically independent.

It will be understood that the armature would act without change of function if current energy were employed to effect its magnetization, and that the same is true of the magnets employed in the other described forms of the device.

Having thus described my invention, what I claim is:

1. An electrical device including a magnet and pole-pieces for said magnet, an armature having a plurality of bearings intermediate its ends and means for changing relative polarities of said pole-pieces and said armature.

2. An electrical instrument including a magnet and pole-pieces therefor, an armature supported at plural points between its ends and having a plurality of relatively movable elements, and means for changing relative polarities of said pole-pieces and said armature.

3. A translator of electrical energy including electro-magnets, and armature elements having reversed windings to produce consequent poles and free ends, and operatively related to said electro-magnets.

4. A translator of electrical energy including means for producing a constant magnetic field, flexibly-connected oscillatory armature elements, and reversed windings one for each of said elements.

5. A translator of electrical energy including armature parts united by a thin and resilient element and means for establishing magnetic fields of force adjacent said armature.

6. A translator of electrical energy including electro-magnets and an armature held at a plurality of points between its ends, said electro-magnets being so disposed as to magnetize said armature and produce like poles between said points, and also like poles at its extremities.

7. A translator of electrical energy including flexibly united armature elements, each fulcrumed intermediate its ends, and means for establishing consequent poles in said armature elements.

8. A translator of electrical energy including permanently-magnetized pole-pieces, a resilient armature having fulcra respectively disposed between its ends and its middle portion, and reversed windings for establishing consequent poles in said armature.

9. A translator of electrical energy including oppositely-disposed pole-pieces having each four terminals, aligned bobbins disposed between said pole-pieces, reversed windings on said bobbins, and an armature extending through said bobbins.

10. A translator of electrical energy including means for producing a constant magnetic field, synchronized oscillatory armature elements, and reversed windings one for each of said elements producing like poles at the remote ends of said armature elements, and different like poles at proximate ends of said armature elements.

11. A translator of electrical energy including means for producing a constant magnetic field, synchronized oscillatory armature elements, and reversed windings one for each of said elements producing like poles at the remote ends of said armature elements, and different like poles at proximate ends of said armature elements, each of said armature elements having its center of oscillation between its poles.

12. A translator of electrical energy including means for producing a constant magnetic field, flexibly connected oscillatory armature elements, and reversed windings one for each of said elements, said armature elements being each mounted at a point which is disposed between the extremities of its winding.

13. An electrical instrument having spaced poles and an armature comprising oscillatory elements disposed therebetween, and resilient means for holding said elements in alignment and out of contact with said poles.

14. An electrical instrument having spaced poles, and aligned oscillatory armature elements disposed between and out of contact with said poles.

15. An electrical instrument having independently mounted, synchronously movable armatures, and means for limiting relative movements of said armatures.

16. An electrical instrument including independently pivoted synchronously movable armatures, and means for limiting relative movements of said armatures.

17. An electrical instrument including two sources of magnetism one of which is alternating, oscillatory armature elements associated with said sources, and means for restraining relative oscillations of said armature elements.

In testimony whereof I affix my signature.

HENRY M. WILLIAMSON.